US012615598B2

(12) United States Patent
Pan et al.

(10) Patent No.: US 12,615,598 B2
(45) Date of Patent: Apr. 28, 2026

(54) TRANSMISSION LINK PROCESSING METHOD AND APPARATUS AND TERMINAL

(71) Applicant: VIVO MOBILE COMMUNICATION CO., LTD., Dongguan (CN)

(72) Inventors: Xueming Pan, Dongguan (CN); Xiaodong Shen, Dongguan (CN); Xian Cui, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 379 days.

(21) Appl. No.: 18/231,315

(22) Filed: Aug. 8, 2023

(65) Prior Publication Data

US 2023/0388943 A1 Nov. 30, 2023

Related U.S. Application Data

(63) Continuation of application No. PCT/CN2022/075335, filed on Feb. 7, 2022.

(30) Foreign Application Priority Data

Feb. 8, 2021 (CN) .......................... 202110183790.1

(51) Int. Cl.
  *H04W 52/52* (2009.01)
  *H04W 52/24* (2009.01)
  *H04W 92/18* (2009.01)
(52) U.S. Cl.
  CPC ......... *H04W 52/52* (2013.01); *H04W 52/241* (2013.01); *H04W 92/18* (2013.01)

(58) Field of Classification Search
  CPC .... H04W 52/52; H04W 52/24; H04W 52/241
  See application file for complete search history.

(56) References Cited

U.S. PATENT DOCUMENTS 6,473,600 B1 * 10/2002 Dvorkin ............... H04B 7/0608
                                              455/127.5
7,142,829 B2 * 11/2006 Sung .................... H04B 7/0608
                                              375/299
(Continued)

FOREIGN PATENT DOCUMENTS

CN       110690866 A       1/2020
CN       110720241 A       1/2020
(Continued)

OTHER PUBLICATIONS

Partial supplementary European Search Report issued in related European Application No. 22749221.2, mailed Jun. 24, 2024, 15 pages.
(Continued)

*Primary Examiner* — Hai V Nguyen
(74) *Attorney, Agent, or Firm* — IPX PLLC

(57) ABSTRACT

The present application discloses a transmission link processing method and apparatus and a terminal. The method includes: determining, by a terminal, a transmit power level of the terminal according to power configuration information; and control, when the transmit power level of the terminal is a first transmit power level, a signal output by the transceiver to not be amplified by the power amplifier; otherwise, controls the signal output by the transceiver to be amplified by the power amplifier, where at the first transmit power level, maximum output power of the terminal is less than a first threshold.

18 Claims, 3 Drawing Sheets

12

Control node

11

11

Terminal

Terminal

(56) References Cited

U.S. PATENT DOCUMENTS

| | | | | |
|---|---|---|---|---|
| 8,095,091 | B1* | 1/2012 | Kopikare | H03G 3/3042 |
| | | | | 455/127.5 |
| 8,538,356 | B2* | 9/2013 | Kopikare | H04W 52/52 |
| | | | | 455/127.5 |
| 8,798,562 | B2* | 8/2014 | Kopikare | H04W 52/52 |
| | | | | 455/574 |
| 8,880,127 | B1* | 11/2014 | Kopikare | H04W 52/0232 |
| | | | | 455/343.1 |
| 9,554,332 | B2* | 1/2017 | Lönnblad | H04W 52/0245 |
| 9,596,649 | B1* | 3/2017 | Kopikare | H04W 52/52 |
| 11,387,797 | B2* | 7/2022 | Drogi | H03F 3/245 |
| 11,985,607 | B2* | 5/2024 | Chincholi | H04W 52/262 |
| 12,074,751 | B2* | 8/2024 | Back | H04L 27/2628 |
| 12,316,405 | B2* | 5/2025 | Mura | H04W 52/367 |
| 12,431,996 | B2* | 9/2025 | Abedini | H04B 7/15528 |
| 2004/0047306 | A1 | 3/2004 | Katagishi et al. | |
| 2005/0143024 | A1* | 6/2005 | Sung | H04W 52/52 |
| | | | | 455/101 |
| 2010/0177707 | A1* | 7/2010 | Essinger | H04W 52/241 |
| | | | | 370/329 |
| 2012/0115538 | A1* | 5/2012 | Kopikare | H04W 52/52 |
| | | | | 455/522 |
| 2020/0229104 | A1* | 7/2020 | MolavianJazi | H04W 52/54 |
| 2020/0229206 | A1* | 7/2020 | Badic | H04W 28/0226 |
| 2021/0091864 | A1* | 3/2021 | Weissman | H04B 17/14 |
| 2022/0015039 | A1* | 1/2022 | Huang | H04W 52/367 |
| 2022/0030525 | A1* | 1/2022 | Chincholi | H04B 17/14 |
| 2022/0278882 | A1* | 9/2022 | Back | H04L 27/36 |
| 2022/0295415 | A1* | 9/2022 | MolavianJazi | H04W 52/365 |
| 2023/0101116 | A1* | 3/2023 | Li | H04W 52/346 |
| 2023/0188964 | A1* | 6/2023 | Pateromichelakis | H04L 67/34 |
| | | | | 709/218 |
| 2023/0354220 | A1* | 11/2023 | Rastegardoost | H04L 5/001 |
| 2023/0379832 | A1* | 11/2023 | Mura | H04W 52/367 |
| 2024/0056208 | A1* | 2/2024 | Abedini | H04J 1/08 |
| 2024/0056978 | A1* | 2/2024 | Sridharan | H04W 52/0274 |
| 2024/0187085 | A1* | 6/2024 | Mcmenamy | H04B 7/15557 |
| 2024/0283290 | A1* | 8/2024 | Elshafie | H02J 50/20 |
| 2024/0365292 | A1* | 10/2024 | Farhoodi | H04L 5/0053 |
| 2025/0039798 | A1* | 1/2025 | Kutz | H04W 52/367 |
| 2025/0247858 | A1* | 7/2025 | Talarico | H04W 74/0808 |
| 2025/0274893 | A1* | 8/2025 | Yao | H04W 24/08 |

FOREIGN PATENT DOCUMENTS

| | | |
|---|---|---|
| CN | 110943947 A | 3/2020 |
| CN | 111050390 A | 4/2020 |
| JP | 2000252843 A | 9/2000 |
| KR | 20030016449 A | 3/2003 |
| WO | 2019205046 A1 | 10/2019 |

OTHER PUBLICATIONS

Extended European Search Report issued in related European Application No. 22749221.2, mailed Sep. 16, 2024, 13 pages.
"3rd Generation Partnership Project; Technical Specification Group Radio Access Network; NR; Physical layer procedures for control (Release 16)", 3GPP Standard; Technical Specification; 3GPP TS 38.213, 3rd Generation Partnership Project (3GPP), Mobile Competence Centre ; 650, Route Des Lucioles ; F-06921 Sophia-Antipolis Cedex ; France, vol. RAN WG1, No. V16.4.0 Jan. 8, 2021.
First Office Action issued in related Chinese Application No. 202110183790.1, mailed Jun. 21, 2024, 7 pages.
International Search Report issued in corresponding International Application No. PCT/CN2022/075335, mailed Apr. 29, 2022, 4 pages.

* cited by examiner

TRANSMISSION LINK PROCESSING METHOD AND APPARATUS AND TERMINAL

CROSS-REFERENCE TO RELATED APPLICATIONS

This application is a continuation of International Application No. PCT/CN2022/075335, filed Feb. 7, 2022, which claims priority to Chinese Patent Application No. 202110183790.1, filed Feb. 8, 2021. The entire contents of each of the above-referenced applications are expressly incorporated herein by reference.

TECHNICAL FIELD

The present application relates to the technical field of communications, and in particular, relates to a transmission link processing method and apparatus and a terminal.

BACKGROUND

A transmission link of a terminal usually includes a transceiver, a Power Amplifier (PA), a switch, a filter, an antenna, and the like. A signal output by the transceiver is amplified by the PA and sent by the antenna. The PA needs to be supplied with power. Due to the limitation of implementation, the PA cannot completely convert input power into output power. PA efficiency can be roughly defined as $PAE=(Pout-Pin)/P_{DC}$, where Pout is output signal power of the PA, Pin is input signal power of the PA, and $P_{DC}$ is DC power supply power of the PA.

During the process of implementing the present application, the inventors found that there are at least the following problems in related technologies:

Based on a PAE test result of the terminal, it can be seen that when the output signal power of the PA is low (for example, below 15 dBm), PAE<10%, which means that 90% of the power supplied to the PA is consumed. In other words, the related technology has the problem of low PA efficiency of the terminal, which leads to excessive power consumption and is undesirable for energy saving of the terminal.

SUMMARY

Embodiments of the present application provide a transmission link processing method and apparatus and a terminal.

According to a first aspect, an embodiment of the present application provides a transmission link processing method, where the transmission link includes: a transceiver and a power amplifier; and the method includes:

determining, by a terminal, a transmit power class of the terminal according to power configuration information; and controlling, by the terminal in a case that the transmit power class of the terminal is a first transmit power class, a signal output by the transceiver to not be amplified by the power amplifier; otherwise, controlling, by the terminal, the signal output by the transceiver to be amplified by the power amplifier;

where at the first transmit power class, maximum output power of the terminal is less than a first threshold.

According to a second aspect, an embodiment of the present application provides a transmission link processing apparatus, where the transmission link includes: a transceiver and a power amplifier; and the apparatus includes:

a level determination module, configured to determine a transmit power class of the terminal according to power configuration information; and a control module, configured to control, in a case that the transmit power class of the terminal is a first transmit power class, a signal output by the transceiver to not be amplified by the power amplifier; otherwise, control the signal output by the transceiver to be amplified by the power amplifier;

where at the first transmit power class, maximum output power of the terminal is less than a first threshold.

According to a third aspect, a terminal is provided, where the terminal includes a processor, a memory, and a program or an instruction stored in the memory and executable on the processor, where when the program or instruction is executed by the processor, steps of the method according to the first aspect are implemented.

According to a fourth aspect, a readable storage medium is provided. The readable storage medium stores a program or an instruction, and the program or the instruction is executed by a processor to implement the steps of the method according to the first aspect.

According to a fifth aspect, a chip is provided. The chip includes a processor and a communications interface, the communications interface is coupled to the processor, and the processor is configured to run a program or an instruction of a network side device to implement the method according to the first aspect.

According to a sixth aspect, a computer program product is provided. The computer program product is stored in a non-transient storage medium. The computer program product is executed by at least one processor to implement the method according to the first aspect.

In the embodiments of the present application, the terminal determines, according to the transmit power class configured by the network through the power configuration information, whether to use the power amplifier for signal amplification, which can improve energy consumption efficiency and reduce power consumption at low transmit power classes.

DETAILED DESCRIPTION

The following describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

The terms "first", "second", and the like in the specification and claims of the present application are used to distinguish between similar objects instead of describing a specific order or sequence. It should be understood that, the terms termed in such a way are interchangeable in proper circumstances, so that the embodiments of the present application can be implemented in an order other than the order illustrated or described herein. Objects classified by "first", "second", and the like are usually of a same type, and the number of objects is not limited. For example, there may be one or more first objects. In addition, in the specification and claims, "and/or" represents at least one of connected objects, and a character "/" generally represents an "or" relationship between associated objects.

It should be noted that the technology described in the embodiments of the present application is not limited to a Long Term Evolution (LTE)/LTE-Advanced (LTE-A) system, and may also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of the present application may be used interchangeably. The technologies described can be applied to both the systems and the radio technologies mentioned above as well as to other systems and radio technologies. A New Radio (NR) system is described in the following description for illustrative purposes, and the NR terminology is used in most of the following description, although these technologies can also be applied to applications other than the NR system application, such as the $6^{th}$ generation (6G) communication system.

Figure 1:
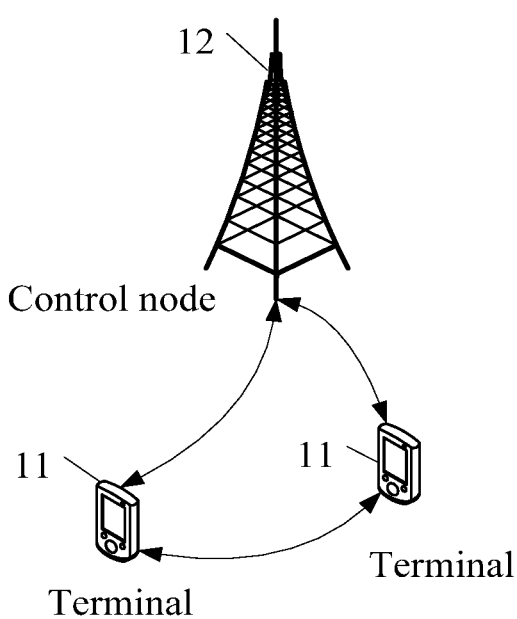
FIG. 1 is a block diagram of a wireless communications system to which embodiments of the present application can be applied.

FIG. 1 is a block diagram of a wireless communication system to which an embodiment of the present application is applicable. The wireless communication system includes a terminal 11 and a network side device 12. The terminal 11 may also be referred to as a terminal device or User Equipment (UE). The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device, vehicle user equipment (VUE), or pedestrian user equipment (PUE). The wearable device includes a bracelet, a headset, glasses, and the like. It should be noted that a specific type of the terminal 11 is not limited in the embodiments of the present application. The network side device 12 may be a base station or a core network device, and the base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a WiFi node, a Transmitting Receiving Point (TRP), or another appropriate term in the art. Provided that the same technical effect is achieved, the base station is not limited to specific technical vocabulary. It should be noted that the base station in an NR system is merely used as an example, but a specific type of the base station is not limited in the embodiments of the present application.

With reference to the accompanying drawings, the following describes in detail the transmission link processing method in the embodiments of the present application based on embodiments and application scenarios.

Figure 2:
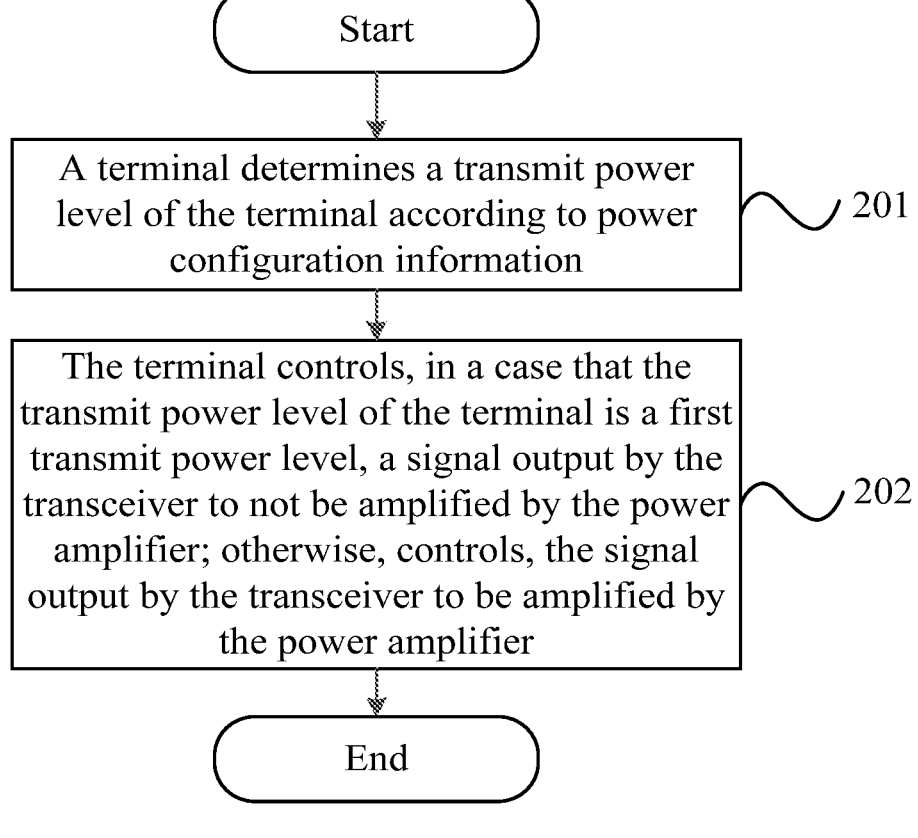
FIG. 2 is a flowchart of steps of a transmission link processing method according to an embodiment of the present application.

As shown in FIG. 2, an embodiment of the present application provides a transmission link processing method, where the transmission link includes: a transceiver and a power amplifier; and the method includes:

Step 201: A terminal determines a transmit power class of the terminal according to power configuration information.

Step 202: The terminal controls, in a case that the transmit power class of the terminal is a first transmit power class, a signal output by the transceiver to not be amplified by the power amplifier; otherwise, controls the signal output by the transceiver to be amplified by the power amplifier.

At the first transmit power class, maximum output power of the terminal is less than a first threshold.

In this embodiment of the present application, the first transmit power class may also be referred to as a low transmit power class. For example, a current transmit power class of Uu includes: PC3 (23 dBm) or PC2 (26 dBm), which can also be called a second transmit power class or a high transmit power class. A current transmit power class of a sidelink (SL) is 23 dBm, which may also be called a second transmit power class or a high transmit power class. The first transmit power class may be called PC4, and at the first transmit power class, the maximum output power of the terminal is lower than the PC3 or PC2.

According to different application scenarios and implementation methods, the maximum transmit power of PC4 can be between 5 and 15 dBm, or the maximum transmit power of PC4 can be between 5 and 10 dBm, or the maximum transmit power of PC4 can be between 10 and 15 dBm. Corresponding first transmit power classes, such as PC4_Uu or PC4_SL, may be respectively defined on a Uu interface and an SL interface.

Figure 3:
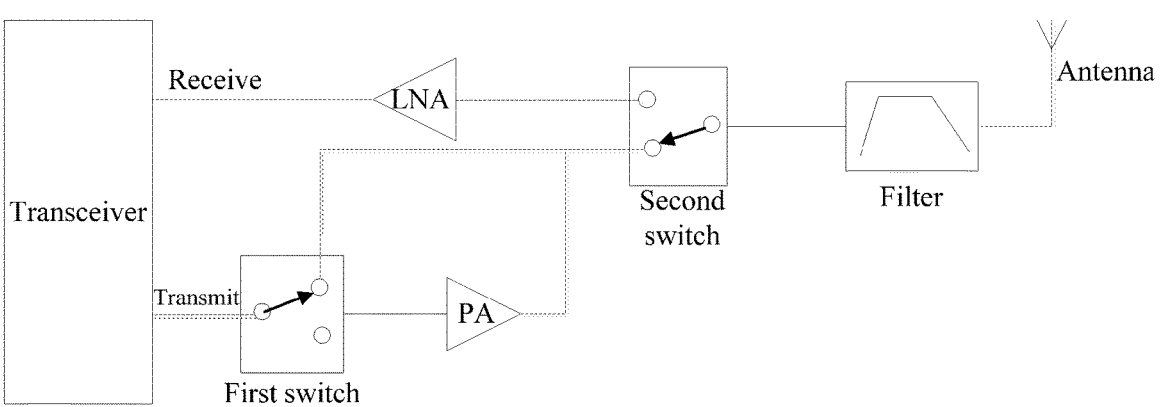
FIG. 3 is a schematic structural diagram 1 of a transmission link in a transmission link processing method according to an embodiment of the present application.
Figure 4:
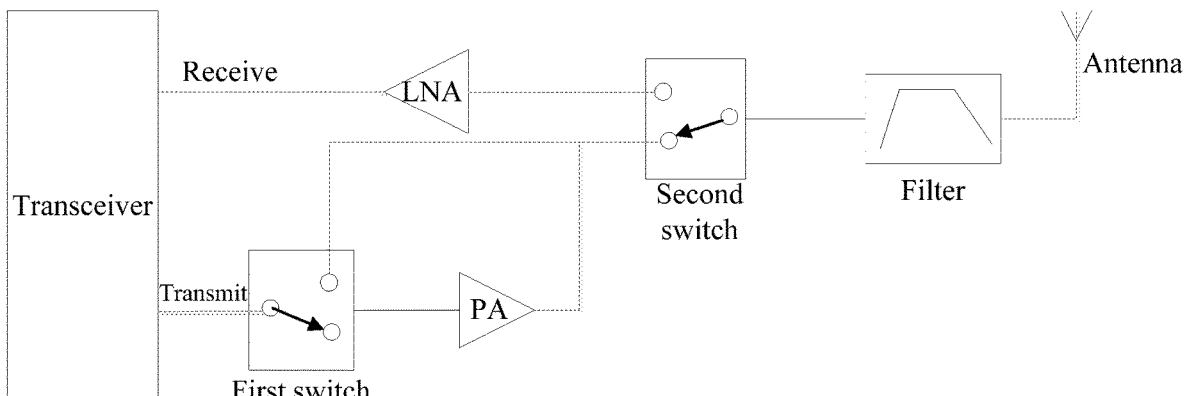
FIG. 4 is a schematic structural diagram 2 of a transmission link in a transmission link processing method according to an embodiment of the present application.

As shown in FIG. 3 and FIG. 4, the transmission link of the terminal includes: a transceiver, a power amplifier PA, a first switch, a second switch, a filter, and an antenna. Switching of the first switch is used to control whether the signal output by the transceiver passes through the power amplifier PA.

As shown in FIG. 3, when the terminal is configured to the first power transmission level (that is, the low power transmission level, such as PC4), the terminal controls the signal output by the transceiver to not be amplified by the power amplifier, that is, the signal output by the transceiver passes through the first switch, the second switch, and the filter and then is sent by the antenna. As shown in FIG. 4, when the terminal is configured to the second power transmission level (that is, the high power transmission level, such as PC2 or PC3), the terminal controls the signal output by the transceiver to be amplified by the power amplifier, that is, the signal output by the transceiver passes through the first switch, the power amplifier, the second switch, and the filter, and then is sent by the antenna.

In at least one embodiment of the present application, the power configuration information is configured for the terminal by the network; where the power configuration information includes at least one of the following:

first configuration information indicating a transmit power class of the Uu interface of the terminal;

second configuration information indicating a usage condition of a transmit power class supported by the Uu interface of the terminal;

third configuration information indicating a transmit power class of a sidelink SL interface of the terminal; or fourth configuration information indicating usage condition information of a transmit power class supported by the SL interface of the terminal.

In some embodiments, the first configuration information includes at least one of the following:

a transmit power class of the Uu interface per cell; for example, per cell configuration/per cell group configuration, and the network configures the same or different Uu transmit power classes for terminals in different cells or different cell groups;

a transmit power class of the Uu interface per terminal; for example, per User Equipment (UE) (per UE) configuration, and the network configures the same Uu transmit power class for all bands of the terminal;

a transmit power class of the Uu interface per frequency of the terminal; for example, per frequency configuration, and the network configures the same or different Uu transmit power classes for different frequencies of the terminal;

a transmit power class of the Uu interface per band of the terminal; for example, per band configuration, and the network configures the same or different Uu transmit power classes for different bands of the terminal;

a transmit power class of the Uu interface per Bandwidth Part (BWP) of the terminal; for example, per BWP configuration, and the network configures the same or different Uu transmit power classes for different BWPs of the terminal;

a transmit power class of the Uu interface per working carrier of the terminal; for example, the network configures the same or different Uu transmit power classes for different carriers of the terminal;

a transmit power class of the Uu interface per carrier group of the terminal; for example, the network configures the same or different Uu transmit power classes for different carrier groups of the terminal; or a transmit power class of the Uu interface per Power Control Group of the terminal; for example, per power control group configuration, and the network configures the same or different Uu transmit power classes for different power control groups of the terminal.

In some embodiments, the second configuration information includes:

a signal received quality threshold corresponding to each transmit power class supported by the Uu interface, for example, a Reference Signal Receiving Power (RSRP) threshold.

In some embodiments, the third configuration information includes at least one of the following:

a transmit power class of the SL interface per cell; for example, the network configures the same or different SL transmit power classes for terminals in different cells or different cell groups;

a transmit power class of the SL interface per terminal (per UE); for example, the network configures the same SL transmit power class for all bands of the terminal;

a transmit power class of the SL interface per frequency of the terminal; for example, the network configures the same or different SL transmit power classes for different frequencies of the terminal;

a transmit power class of the SL interface per band of the terminal; for example, the network configures the same or different SL transmit power classes for different bands of the terminal;

a transmit power class of the SL interface per BWP of the terminal; for example, the network configures the same or different SL transmit power classes for different BWPs of the terminal;

a transmit power class of the SL interface per working carrier of the terminal; for example, the network configures the same or different SL transmit power classes for different carriers of the terminal; or a transmit power class of the SL interface per carrier group of the terminal; for example, the network configures the same or different SL transmit power classes for different carrier groups of the terminal.

In some embodiments, the fourth configuration information includes:

a signal received quality threshold corresponding to each transmit power class supported by the SL interface; for example, a Reference Signal Receiving Power (RSRP) threshold.

In at least one embodiment of the present application, if the power configuration information includes: third configuration information and/or third configuration information, step 201 includes:

determining, in a case that signal received quality of the terminal is greater than the signal received quality threshold, that the transmit power class of the Uu interface or the SL interface of the terminal is the first transmit power class;

or determining, in a case that signal received quality of the terminal is less than the signal received quality threshold, that the transmit power class of the Uu interface or the SL interface of the terminal is the second transmit power class; where at the second transmit power class, maximum output power of the terminal is greater than a second threshold.

For example, the network configures the usage condition of the Uu transmit power class for the terminal, for example, configures an RSRP measurement threshold of the terminal as X dB. When the RSRP measurement result of the downlink signal measured by the terminal is greater than X dB, the low transmit power class PC4 can be used; otherwise, the high transmit power class such as PC2/PC3 can be used. The terminal switches the Uu power class according to the comparison between the RSRP measurement result and the threshold.

For another example, the network configures the usage condition of the SL transmit power class for the terminal, for example, configures an SL RSRP measurement threshold of the terminal as Y dB. When the RSRP measurement result of the SL signal measured by the terminal is greater than Y dB, the low transmit power class PC4_SL can be used; otherwise, the high transmit power class can be used. The terminal switches the power SL level according to the comparison between the SL RSRP measurement result and the threshold.

In at least one embodiment of the present application, before step 203, the method further includes:

reporting, by the terminal, a transmit power class capability of the terminal to a network side device; and receiving, by the terminal, the power configuration information sent by the network side device according to the transmit power class capability of the terminal.

In some embodiments, the network directly configures the maximum transmit power class of the Uu interface of the terminal; for example, the maximum transmit power class of the terminal is configured as the low transmit power class PC4 according to the deployment scenario or the service requirements of the terminal.

For example, the network configures, according to the deployment form and coverage requirements (such as small cells and indoor cells), that all terminals with low power class capabilities in the network use the low transmit power class, for example, configures through system broadcast information. For another example, the network configures, according to actual service requirements, coverage requirements, and energy-saving requirements of the terminal, that terminals with low power class capabilities in the network use the low transmit power class, for example, configures through terminal-specific Radio Resource Control (RRC).

In some embodiments, the network directly configures the maximum transmit power class of the SL interface of the terminal; for example, may configure the SL maximum transmit power class of the terminal as the low transmit power class PC4_SL according to user service requirements.

For example, the network configures, according to the deployment form and coverage requirements, that all terminals with SL low power class capabilities in the network use the SL low transmit power class, for example, configures through system broadcast information. For another example, the network configures, according to actual service requirements, coverage requirements, and energy-saving requirements of the terminal, that terminals with SL low power class capabilities in the network use the SL low transmit power class, for example, configures through terminal-specific RRC.

In some embodiments, the transmit power class capability of the terminal is used to indicate at least one of the following:

indicating that the Uu interface of the terminal supports the first transmit power class;

indicating each transmit power class supported by the Uu interface of the terminal, where each transmit power class includes the first transmit power class; for example, the Uu interface of the terminal at least supports the first transmit power class and the second transmit power class;

indicating that the SL interface of the terminal supports the first transmit power class; or indicating each transmit power class supported by the SL interface of the terminal, where each transmit power class includes the first transmit power class; for example, at least the SL interface of the terminal supports the first transmit power class and the second transmit power class.

In some embodiments, the transmit power class capability of the terminal is at least one of the following:

a transmit power class capability per terminal; for example, a terminal has the same transmit power class capability in all bands supported by the terminal;

a transmit power class capability per frequency of the terminal; for example, the terminal is allowed to report that it has the same or different transmit power class capabilities in different supported frequencies (bands);

a transmit power class capability per band of the terminal; for example, the terminal is allowed to report that it has the same or different transmit power class capabilities in different supported bands; or a transmit power class capability per BWP of the terminal; for example, the terminal is allowed to report that it has the same or different transmit power class capabilities in different supported BWP.

In the embodiments of the present application, the terminal determines, according to the transmit power class configured by the network through the power configuration information, whether to use the power amplifier for signal amplification, and when the required transmit power class is low, the terminal directly transmits, without passing through the power amplifier for amplification, the signal output by the transceiver, which can improve energy consumption efficiency and reduce power consumption at low transmit power classes.

It should be noted that, the transmission link processing method provided in the embodiment of the present application may be performed by a transmission link processing apparatus, or a control module in the transmission link processing apparatus for executing the transmission link processing method. In the embodiments of the present application, an example in which the transmission link processing apparatus performs the transmission link processing method is used to describe the transmission link processing apparatus provided in the embodiments of the present application.

Figure 5:
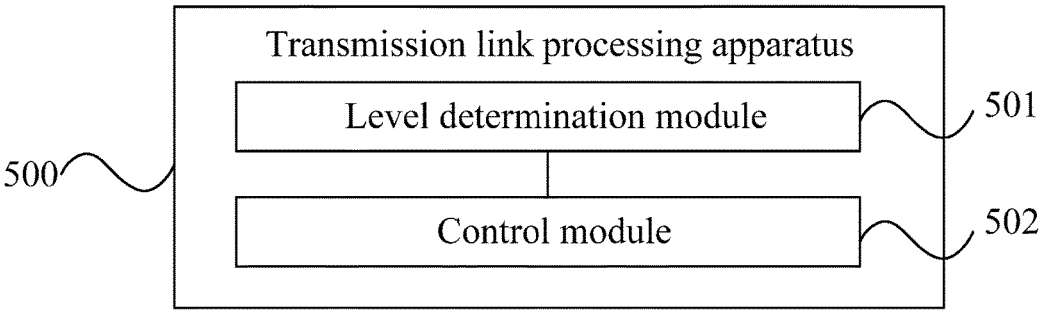
FIG. 5 is a schematic structural diagram of a transmission link processing apparatus according to an embodiment of the present application.

As shown in FIG. 5, an embodiment of the present application further provides a transmission link processing apparatus 500, where the transmission link includes: a transceiver and a power amplifier; and the apparatus includes:

a level determination module 501, configured to determine a transmit power class of the terminal according to power configuration information; and a control module 502, configured to control, in a case that the transmit power class of the terminal is a first transmit power class, a signal output by the transceiver to not be amplified by the power amplifier; otherwise, control the signal output by the transceiver to be amplified by the power amplifier.

At the first transmit power class, maximum output power of the terminal is less than a first threshold.

In some embodiments, the power configuration information includes at least one of the following:

first configuration information indicating a transmit power class of the Uu interface of the terminal;

second configuration information indicating a usage condition of a transmit power class supported by the Uu interface of the terminal;

third configuration information indicating a transmit power class of a sidelink SL interface of the terminal; or fourth configuration information indicating usage condition information of a transmit power class supported by the SL interface of the terminal.

In some embodiments, the first configuration information includes at least one of the following:

a transmit power class of the Uu interface per cell;

a transmit power class of the Uu interface per terminal;

a transmit power class of the Uu interface per frequency of the terminal;

a transmit power class of the Uu interface per band of the terminal;

a transmit power class of the Uu interface per bandwidth part BWP of the terminal;

a transmit power class of the Uu interface per carrier of the terminal;

a transmit power class of the Uu interface per carrier group of the terminal; or a transmit power class of the Uu interface per power control group of the terminal.

In some embodiments, the second configuration information includes:

a signal received quality threshold corresponding to each transmit power class supported by the Uu interface, In some embodiments, the third configuration information includes at least one of the following:

a transmit power class of the SL interface per cell;

a transmit power class of the SL interface per terminal;

a transmit power class of the SL interface per frequency of the terminal;

a transmit power class of the SL interface per band of the terminal;

a transmit power class of the SL interface per BWP of the terminal;

a transmit power class of the SL interface per carrier of the terminal; or a transmit power class of the SL interface per carrier group of the terminal.

In some embodiments, the fourth configuration information includes:

a signal received quality threshold corresponding to each transmit power class supported by the SL interface.

In some embodiments, the level determination module includes:

a first level determination submodule, configured to determine, in a case that signal received quality of the terminal is greater than the signal received quality threshold, that the transmit power class of the Uu interface or the SL interface of the terminal is the first transmit power class;

and/or a second level determining submodule, configured to determine, in a case that signal received quality of the terminal is less than the signal received quality threshold, that the transmit power class of the Uu interface or the SL interface of the terminal is the second transmit power class; where at the second transmit power class, maximum output power of the terminal is greater than a second threshold.

In some embodiments, the apparatus further includes:

a capability reporting module, configured to report a transmit power class capability of the terminal to a network side device; and an information receiving module, configured to receive the power configuration information sent by the network side device according to the transmit power class capability of the terminal.

In some embodiments, the transmit power class capability of the terminal is used to indicate at least one of the following:

indicating that the Uu interface of the terminal supports the first transmit power class;

indicating each transmit power class supported by the Uu interface of the terminal, where each transmit power class includes the first transmit power class;

indicating that the SL interface of the terminal supports the first transmit power class; or indicating each transmit power class supported by the SL interface of the terminal, where each transmit power class includes the first transmit power class.

In some embodiments, the transmit power class capability of the terminal is at least one of the following:

a transmit power class capability per terminal;

a transmit power class capability per frequency of the terminal;

a transmit power class capability per band of the terminal; or a transmit power class capability per BWP of the terminal.

In the embodiments of the present application, the terminal determines, according to the transmit power class configured by the network through the power configuration information, whether to use the power amplifier for signal amplification, and when the required transmit power class is low, the terminal directly transmits, without passing through the power amplifier for amplification, the signal output by the transceiver, which can improve energy consumption efficiency and reduce power consumption at low transmit power classes.

It should be noted that the transmission link processing apparatus provided in the embodiment of the present application is an apparatus capable of executing the above-mentioned transmission link processing method, and all embodiments of the above-mentioned transmission link processing method are applicable to this apparatus, and can achieve the same or similar effects.

The transmission link processing apparatus in the embodiments of the present application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a Network Attached Storage (NAS), a personal computer (PC), a television (TV), a teller machine, a self-service machine, or the like. This is not specifically limited in the embodiments of the present application.

The transmission link processing apparatus in the embodiments of the present application may be an apparatus with an operating system. The operating system may be an Android operating system, an iOS operating system, or another possible operating system. This is not specifically limited in this embodiment of the present application.

The transmission link processing apparatus provided in this embodiment of the present application can implement processes implemented by the payment interface display apparatus in the method embodiments of FIG. 2 to FIG. 4. To avoid repetition, details are not described herein again.

Figure 6:
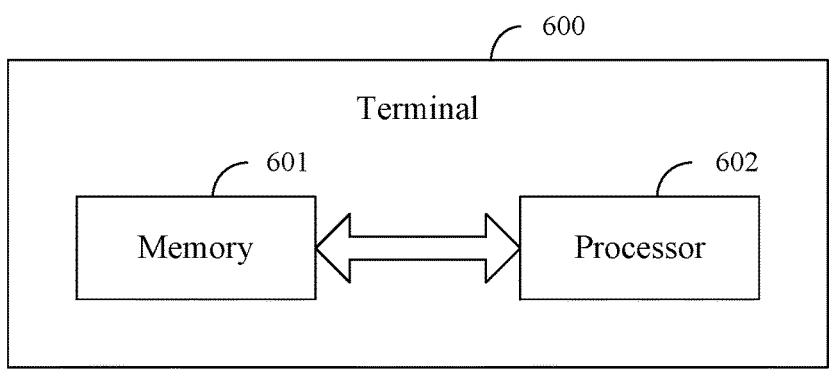
FIG. 6 is a schematic structural diagram 1 of a terminal according to an embodiment of the present application.

As shown in FIG. 6, the embodiments of the present application also provide a terminal 600, including a processor 601, a memory 602, and programs or instructions stored in the memory 602 and executable on the processor 601. When the program or instruction is executed by the processor 601, the various processes of the foregoing transmission link processing method embodiments can be achieved, and the same technical effect can be achieved. To avoid repetition, details are not repeated here.

Figure 7:
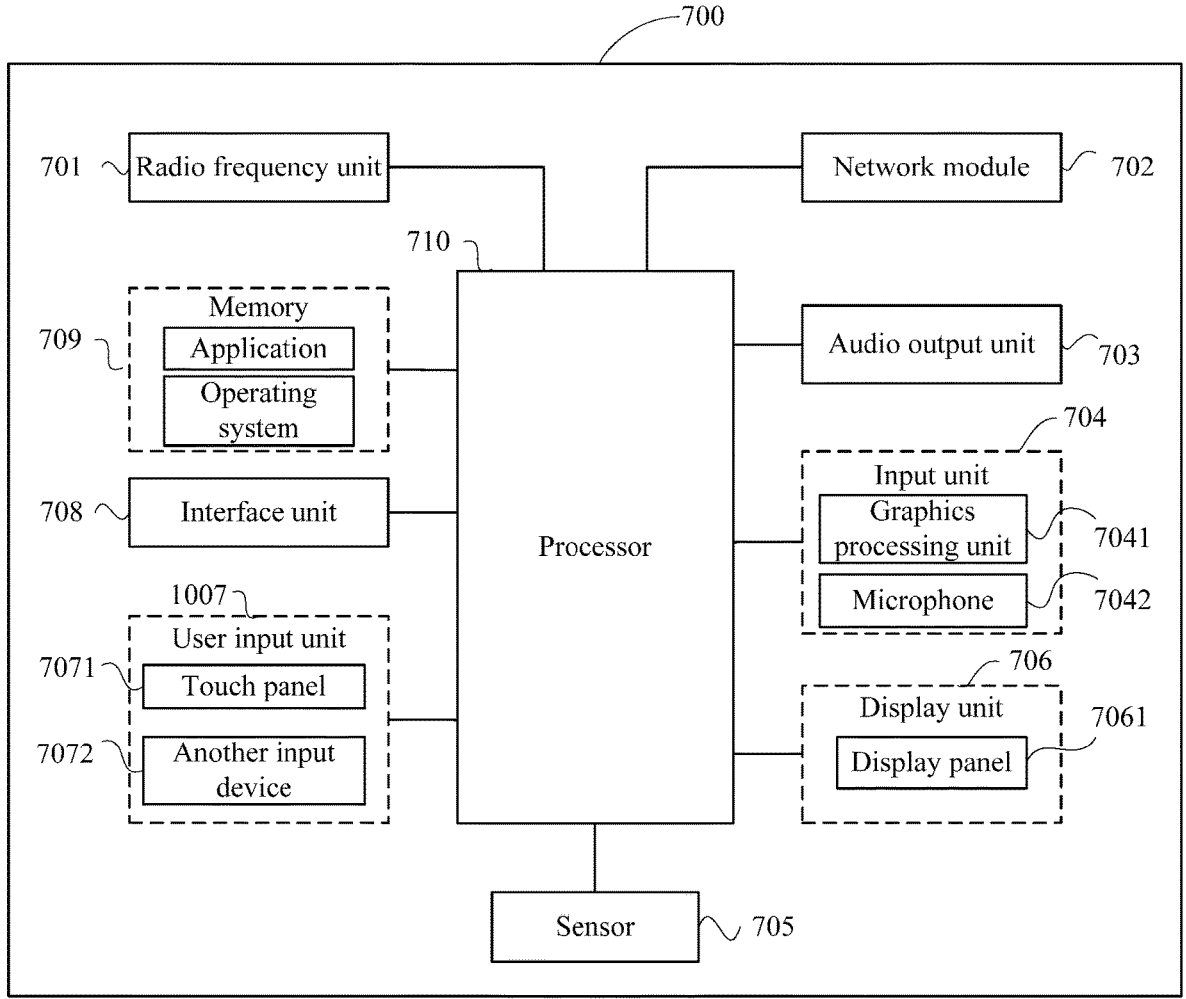
FIG. 7 is a schematic structural diagram 2 of a terminal according to an embodiment of the present application.

FIG. 7 is a schematic diagram of a hardware structure of a terminal according to an embodiment of the present application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that, in this embodiment of the present application, the input unit 704 may include a Graphics Processing Unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. In some embodiments, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of the present application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory and non-transient memory. The non-transient memory may be a Read-only Memory (ROM), a Programmable ROM (PROM), an Erasable PROM (EPROM), an Electrically EPROM (EEPROM), or a flash memory, such as at least one magnetic disk storage component, a flash memory component, or another non-transitory solid-state storage component.

The processor 710 may include one or more processing units. In some embodiments, an application processor and a modem processor may be integrated into the processor 710. The application processor mainly processes an operating system, a user interface, an application, an instruction, or the like. The modem processor mainly processes wireless communication, for example, a baseband processor. It can be understood that, the modem processor may not be integrated into the processor 710.

The processor 710 is configured to determine a transmit power class of the terminal according to power configuration information; and control, in a case that the transmit power class of the terminal is a first transmit power class, a signal output by the transceiver to not be amplified by the power amplifier; otherwise, controls the signal output by the transceiver to be amplified by the power amplifier.

At the first transmit power class, maximum output power of the terminal is less than a first threshold.

In the embodiments of the present application, the terminal determines, according to the transmit power class configured by the network through the power configuration information, whether to use the power amplifier for signal amplification, and when the required transmit power class is low, the terminal directly transmits, without passing through the power amplifier for amplification, the signal output by the transceiver, which can improve energy consumption efficiency and reduce power consumption at low transmit power classes.

It should be noted that the transmission link processing apparatus provided in the embodiment of the present application is an apparatus capable of executing the above-mentioned transmission link processing method, and all embodiments of the above-mentioned transmission link processing method are applicable to this apparatus, and can achieve the same or similar effects.

The embodiment of the present application also provides a readable storage medium, the readable storage medium stores a program or an instruction, and when the program or instruction is executed by the processor, each process of the above embodiment of the transmission link processing method is implemented, and the same technical effect can be achieved. To avoid repetition, details are not described herein.

The processor is a processor in the electronic device in the foregoing embodiment. The readable storage medium includes a computer-readable storage medium, such as a computer Read-only Memory (ROM), a Random Access Memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing transmission link processing method and the same technical effects can be achieved. To avoid repetition, details are not described herein again.

It should be understood that the chip mentioned in this embodiment of the present application may also be referred to as a system-level chip, a system chip, a chip system, or an on-chip system chip.

The embodiments of the present application further provide a computer program product, the computer program product is stored in a non-transient storage medium, and the computer program product is executed by at least one processor to implement the various processes of the transmission link processing method embodiments, and the same technical effects can be achieved. To avoid repetition, details are not described herein again.

It should be noted that, in this specification, the terms "include", "include", or any other variant thereof are intended to cover a non-exclusive inclusion, so that a process, a method, an article, or an apparatus that includes a list of elements not only includes those elements but also includes other elements which are not expressly listed, or further includes elements inherent to such a process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of the present application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of the present application essentially, or the part contributing to the related technology may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present application.

The embodiments of the present application are described above with reference to the accompanying drawings, but the present application is not limited to the above implementations, and the above implementations are only illustrative and not restrictive. Under the enlightenment of the present application, those of ordinary skill in the art can make many forms without departing from the purpose of the present application and the protection scope of the claims, all of which fall within the protection of the present application.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraints of the technical solutions. A person skilled in the art can use different methods to implement the described functions for each particular application, but it should not be considered that the implementation goes beyond the scope of the embodiments of the present application.

Those skilled in the art can clearly understand that to describe conveniently and concisely, for a specific working process of the system, apparatus, and unit described above, refer to the corresponding process in the foregoing method embodiments. Details are not described herein again.

In the embodiments provided in the present application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of the application may be integrated into one processing unit, or each unit may exist separately physically, or two or more units may be integrated into one unit.

When the functions are implemented in a form of a software functional unit and sold or used as an independent product, the functions may be stored in a computer readable storage medium. Based on this understanding, the essence of the technical solutions of the application, the part contributing to the related technology, or some of the technical solutions may be represented in a form of software product. The computer software product is stored in a storage medium, and includes several instructions to enable a computer device (which may be a personal computer, a server, a network device, or the like) to perform all or some of the steps of the method described in various embodiments of the application. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling related hardware. The program may be stored in a computer readable storage medium. When the program runs, the processes of the methods in the embodiments are performed. The storage medium may be a magnetic disk, an optical disc, a ROM, a RAM, or the like.

The foregoing descriptions are merely exemplary implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

The invention claimed is:

1. A transmission link processing method, comprising:
reporting, by a terminal, a transmit power class capability of the terminal to a network side device, wherein the transmit power class capability is a power class that is supported by the terminal to perform signal transmission;
receiving, by the terminal, power configuration information sent by the network side device according to the transmit power class capability of the terminal;
determining, by the terminal, a transmit power class of the terminal according to the power configuration information, wherein a transmission link of the terminal comprises: a transceiver and a power amplifier; and
controlling, by the terminal when the transmit power class of the terminal is a first transmit power class, a signal output by the transceiver to not be amplified by the power amplifier; otherwise, controlling, by the terminal, the signal output by the transceiver to be amplified by the power amplifier,
wherein at the first transmit power class, maximum output power of the terminal is less than a first threshold.

2. The transmission link processing method according to claim 1, wherein the power configuration information comprises at least one of the following:
first configuration information indicating a transmit power class of an Uu interface of the terminal;
second configuration information indicating a usage condition of a transmit power class supported by the Uu interface of the terminal;

third configuration information indicating a transmit power class of a sidelink (SL) interface of the terminal; or fourth configuration information indicating usage condition information of a transmit power class supported by the SL interface of the terminal.

3. The transmission link processing method according to claim 2, wherein the first configuration information comprises at least one of the following:

a transmit power class of the Uu interface per cell;

a transmit power class of the Uu interface per terminal;

a transmit power class of the Uu interface per frequency of the terminal;

a transmit power class of the Uu interface per band of the terminal;

a transmit power class of the Uu interface per bandwidth part (BWP) of the terminal;

a transmit power class of the Uu interface per carrier of the terminal;

a transmit power class of the Uu interface per carrier group of the terminal; or a transmit power class of the Uu interface per power control group of the terminal.

4. The transmission link processing method according to claim 2, wherein the second configuration information comprises:

a signal received quality threshold corresponding to each transmit power class supported by the Uu interface.

5. The transmission link processing method according to claim 4, wherein the determining, by the terminal, the transmit power class of the terminal according to the power configuration information comprises:

determining, when signal received quality of the terminal is greater than the signal received quality threshold, that the transmit power class of the Uu interface or the SL interface of the terminal is the first transmit power class; or determining, when signal received quality of the terminal is less than the signal received quality threshold, that the transmit power class of the Uu interface or the SL interface of the terminal is a second transmit power class, wherein at the second transmit power class, maximum output power of the terminal is greater than a second threshold.

6. The transmission link processing method according to claim 2, wherein the third configuration information comprises at least one of the following:

a transmit power class of the SL interface per cell;

a transmit power class of the SL interface per terminal;

a transmit power class of the SL interface per frequency of the terminal;

a transmit power class of the SL interface per band of the terminal;

a transmit power class of the SL interface per BWP of the terminal;

a transmit power class of the SL interface per carrier of the terminal; or a transmit power class of the SL interface per carrier group of the terminal.

7. The transmission link processing method according to claim 2, wherein the fourth configuration information comprises:

a signal received quality threshold corresponding to each transmit power class supported by the SL interface.

8. The transmission link processing method according to claim 1, wherein the transmit power class capability of the terminal indicates at least one of the following:

indicating that an Uu interface of the terminal supports the first transmit power class;

indicating each transmit power class supported by the Uu interface of the terminal, wherein each transmit power class comprises the first transmit power class;

indicating that an SL interface of the terminal supports the first transmit power class; or indicating each transmit power class supported by the SL interface of the terminal, wherein each transmit power class comprises the first transmit power class.

9. The transmission link processing method according to claim 1, wherein the transmit power class capability of the terminal is at least one of the following:

a transmit power class capability per terminal;

a transmit power class capability per frequency of the terminal;

a transmit power class capability per band of the terminal; or a transmit power class capability per BWP of the terminal.

10. A terminal, comprising:

a memory storing a computer program; and a processor coupled to the memory and configured to execute the computer program to perform operations comprising:

reporting a transmit power class capability of the terminal to a network side device, wherein the transmit power class capability is a power class that is supported by the terminal to perform signal transmission;

receiving power configuration information sent by the network side device according to the transmit power class capability of the terminal;

determining, a transmit power class of the terminal according to power configuration information, wherein a transmission link of the terminal comprises: a transceiver and a power amplifier; and controlling, when the transmit power class of the terminal is a first transmit power class, a signal output by the transceiver to not be amplified by the power amplifier; otherwise, controlling, the signal output by the transceiver to be amplified by the power amplifier, wherein at the first transmit power class, maximum output power of the terminal is less than a first threshold.

11. The terminal according to claim 10, wherein the power configuration information comprises at least one of the following:

first configuration information indicating a transmit power class of an Uu interface of the terminal;

second configuration information indicating a usage condition of a transmit power class supported by the Uu interface of the terminal;

third configuration information indicating a transmit power class of a sidelink (SL) interface of the terminal; or fourth configuration information indicating usage condition information of a transmit power class supported by the SL interface of the terminal.

12. The terminal according to claim 11, wherein the first configuration information comprises at least one of the following:

a transmit power class of the Uu interface per cell;

a transmit power class of the Uu interface per terminal;

a transmit power class of the Uu interface per frequency of the terminal;

a transmit power class of the Uu interface per band of the terminal;

a transmit power class of the Uu interface per bandwidth part (BWP) of the terminal;

a transmit power class of the Uu interface per carrier of the terminal;

a transmit power class of the Uu interface per carrier group of the terminal; or a transmit power class of the Uu interface per power control group of the terminal.

13. The terminal according to claim 11, wherein the second configuration information comprises:

a signal received quality threshold corresponding to each transmit power class supported by the Uu interface.

14. The terminal according to claim 13, wherein the determining, by the terminal, the transmit power class of the terminal according to the power configuration information comprises:

determining, when signal received quality of the terminal is greater than the signal received quality threshold, that the transmit power class of the Uu interface or the SL interface of the terminal is the first transmit power class; or determining, when signal received quality of the terminal is less than the signal received quality threshold, that the transmit power class of the Uu interface or the SL interface of the terminal is a second transmit power class, wherein at the second transmit power class, maximum output power of the terminal is greater than a second threshold.

15. The terminal according to claim 11, wherein the third configuration information comprises at least one of the following:

a transmit power class of the SL interface per cell;

a transmit power class of the SL interface per terminal;

a transmit power class of the SL interface per frequency of the terminal;

a transmit power class of the SL interface per band of the terminal;

a transmit power class of the SL interface per BWP of the terminal;

a transmit power class of the SL interface per carrier of the terminal; or a transmit power class of the SL interface per carrier group of the terminal.

16. The terminal according to claim 11, wherein the fourth configuration information comprises:

a signal received quality threshold corresponding to each transmit power class supported by the SL interface.

17. The terminal according to claim 10, wherein the transmit power class capability of the terminal indicates at least one of the following:

indicating that an Uu interface of the terminal supports the first transmit power class;

indicating each transmit power class supported by the Uu interface of the terminal, wherein each transmit power class comprises the first transmit power class;

indicating that an SL interface of the terminal supports the first transmit power class; or indicating each transmit power class supported by the SL interface of the terminal, wherein each transmit power level comprises the first transmit power class.

18. A non-transitory computer-readable storage medium, storing a computer program, when the computer program is executed by a processor, causes the processor to perform operations comprising:

reporting a transmit power class capability of a terminal to a network side device, wherein the transmit power class capability is a power class that is supported by the terminal to perform signal transmission;

receiving power configuration information sent by the network side device according to the transmit power class capability of the terminal;

determining, a transmit power class of the terminal according to power configuration information, wherein a transmission link of the terminal comprises: a transceiver and a power amplifier; and controlling, when the transmit power class of the terminal is a first transmit power class, a signal output by the transceiver to not be amplified by the power amplifier; otherwise, controlling, the signal output by the transceiver to be amplified by the power amplifier, wherein at the first transmit power class, maximum output power of the terminal is less than a first threshold.

* * * * *